US010362625B2

(12) United States Patent
Kela et al.

(10) Patent No.: US 10,362,625 B2
(45) Date of Patent: Jul. 23, 2019

(54) APPARATUS AND METHODS IN A WIRELESS COMMUNICATION NETWORK

(71) Applicant: Huawei Technologies Co., Ltd., Shenzhen (CN)

(72) Inventors: Petteri Kela, Helsinki (FI); Mario Costa, Helsinki (FI); Henrik Lundqvist, Kista (SE); Xavier Gelabert, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/702,307

(22) Filed: Sep. 12, 2017

(65) Prior Publication Data
US 2018/0007734 A1 Jan. 4, 2018

Related U.S. Application Data

(63) Continuation of application No. PCT/EP2015/055289, filed on Mar. 13, 2015.

(51) Int. Cl.
*H04W 72/04* (2009.01)
*H04W 76/28* (2018.01)
*H04W 52/02* (2009.01)

(52) U.S. Cl.
CPC ....... *H04W 76/28* (2018.02); *H04W 52/0216* (2013.01); *H04W 52/0229* (2013.01);
(Continued)

(58) Field of Classification Search
CPC ............. H04W 76/28; H04W 52/0229; H04W 52/0216; H04W 72/042; Y02D 70/1242;
(Continued)

(56) References Cited

U.S. PATENT DOCUMENTS 7,508,781 B2 * 3/2009 Liu ................... H04W 52/0216
370/311
9,924,503 B2 * 3/2018 Kim ...................... H04W 8/005
(Continued)

FOREIGN PATENT DOCUMENTS

| CN | 103004254 A | 3/2013 |
|----|-------------|--------|
| CN | 103503518 A | 1/2014 |
| WO | 2014069946 A1 | 5/2014 |

OTHER PUBLICATIONS

Palit, R. et al, "Anatomy of WiFi Access Traffic of Smartphones and Implications for Energy Saving Techniques", International Journal of Energy, Information and Communications, pp. 1-16, vol. 3, Issue 1, 2012.
(Continued)

*Primary Examiner* — Jay P Patel
(74) *Attorney, Agent, or Firm* — Slater Matsil, LLP

(57) ABSTRACT

Implementations describe a user equipment, an access node, and to methods for a user equipment and for an access node. The user equipment includes a receiver configured to receive a downlink control signal (CTRLS) over a downlink control channel (PDCCH) from an access node. The user device also includes a processor configured to, when the user equipment is in a Radio Resource Control (RRC) connected mode, switch on the receiver at a time point ($t_{start\_symbol}$) when a symbol comprising the downlink control signal (CTRLS) starts in time domain. The processor is further configured to switch off the receiver at a time point ($t_{end\_symbol}$) when the symbol comprising the downlink control channel (CTRLS) ends in time domain.

12 Claims, 8 Drawing Sheets

(52) U.S. Cl.
CPC ....... *H04W 72/042* (2013.01); *Y02D 70/1226* (2018.01); *Y02D 70/1242* (2018.01); *Y02D 70/1262* (2018.01); *Y02D 70/1264* (2018.01); *Y02D 70/146* (2018.01); *Y02D 70/23* (2018.01); *Y02D 70/24* (2018.01)

(58) Field of Classification Search
CPC ........... Y02D 70/1226; Y02D 70/1262; Y02D 70/146; Y02D 70/23; Y02D 70/1264; Y02D 70/24
See application file for complete search history.

(56) References Cited

U.S. PATENT DOCUMENTS

| | | | | |
|---|---|---|---|---|
| 2009/0213821 | A1* | 8/2009 | Fonseca, Jr. ...... | H04W 52/0225 370/338 |
| 2012/0329456 | A1* | 12/2012 | Makh .................... | H04W 48/14 455/435.1 |
| 2013/0122893 | A1* | 5/2013 | Turtinen ............... | H04W 8/005 455/423 |
| 2013/0229274 | A1* | 9/2013 | Kumar ................ | B60R 25/1025 340/429 |
| 2014/0086130 | A1 | 3/2014 | Nakamori et al. | |
| 2014/0133430 | A1 | 5/2014 | Yang et al. | |
| 2014/0347006 | A1* | 11/2014 | Kim ....................... | H02J 7/025 320/108 |
| 2015/0003311 | A1 | 1/2015 | Feuersaenger et al. | |
| 2015/0237582 | A1 | 8/2015 | Ishii | |
| 2016/0135109 | A1* | 5/2016 | Hampel ................. | H04W 4/70 370/315 |
| 2016/0135242 | A1* | 5/2016 | Hampel ................ | H04W 40/02 370/329 |
| 2016/0219574 | A1* | 7/2016 | Ribeiro ............. | H04W 52/0216 |

OTHER PUBLICATIONS

"Cisco Visual Networking Index: Global Mobile Data Traffic Forecast Update, 2012-2017", CISCO, White Paper, Feb. 6, 2013, 34 pages.

Levanen, T. et al., "Low Latency Radio Interface for 5G Flexible TDD Local Area Communications", in Proc. IEEE ICC'14, Jun. 2014, total 7 pages.

METIS 2014 Deliverable D1.2 "Initial Channel Models based on Measurements", V1.0, Contractual Date of Delivery: Apr. 30, 2014, 153 pages.

Lähetkangas, E., et al., "On the TDD Subframe Structure for Beyond 4G Radio Access Network", in Proc. Future Network and MobileSummit 2013, 10 pages.

Cuny, R. et al., "VoIP in 3G Networks: An End-to-End Quality of Service Analysis," in Vehicular Technology Conference, VTC 2003-Spring, 5 pages, Jeju Island, Korea, Apr. 2003.

* cited by examiner

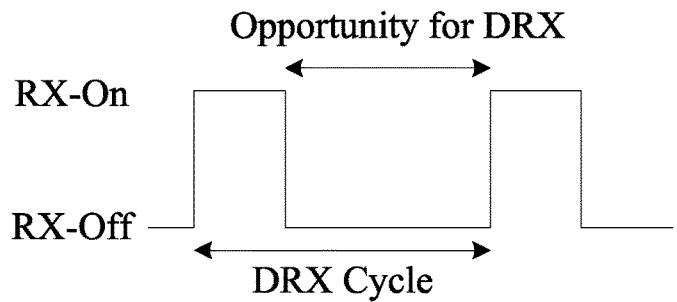
Fig. 5a
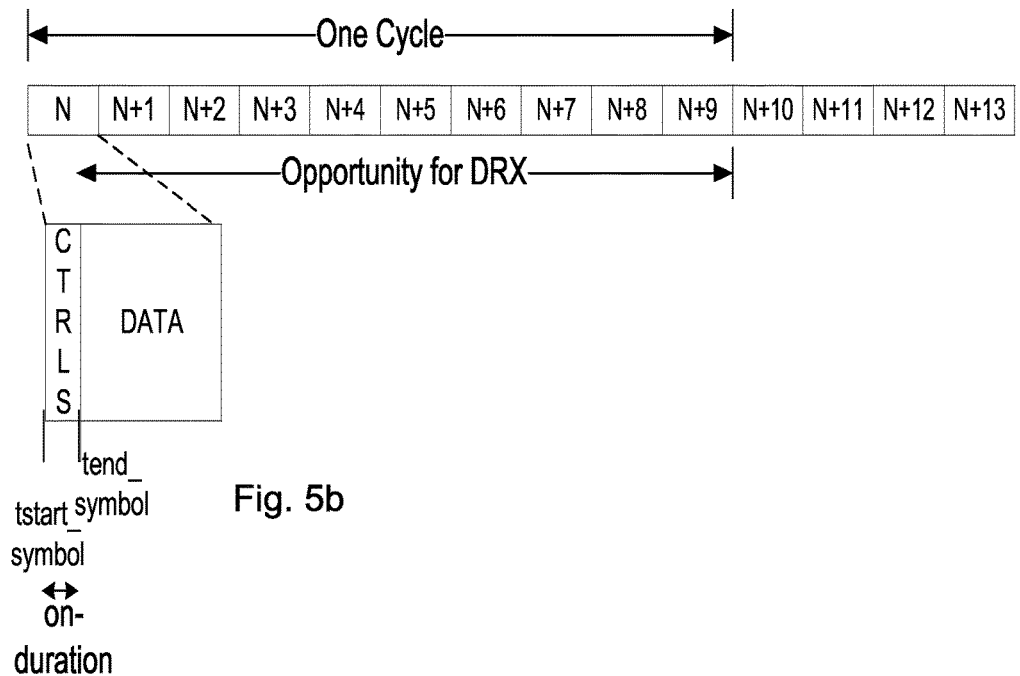
Fig. 5b
| User ID | DRX mode |
|---|---|
Fig. 6a
| RNTI 1 | RNTI 2 | RNTI 3 |
|---|---|---|
Fig. 6b
| RS | RNTI |
|---|---|
Fig. 6c

APPARATUS AND METHODS IN A WIRELESS COMMUNICATION NETWORK

CROSS-REFERENCE TO RELATED APPLICATIONS

This application is a continuation of International Application No. PCT/EP2015/055289, filed on Mar. 13, 2015, the disclosure of which is hereby incorporated by reference in its entirety.

TECHNICAL FIELD

Implementations described herein relate generally to a user equipment, to an access node, to methods for a user equipment and for an access node, and to a computer program implementing the methods.

BACKGROUND

A wireless network generally includes several Access Nodes (ANs) and several user equipments (UEs). In wireless networks the user equipments have different operation modes (OMs) depending on the type of data that is being transmitted and/or received. An operation mode can e.g. be a set of procedures that specify the functionalities of the user equipments in order to ensure the correct data transfer between the network and the user equipments. The type of data may here refer to the different characteristics of data traffic in terms of inter-arrival times, burstiness, etc. The different operation modes may also account for the case where neither transmissions nor receptions have been scheduled for a particular user equipment.

One such operation mode is a discontinuous reception (DRX) mode. The DRX mode aims at saving energy of the UE by turning the receiver off during the instants of time where there is no data to be received. Hence, the design of the DRX mode depends on the type of data to be received, and/or on the frame structure of the wireless network.

In conventional solutions, the DRX schemes have not been optimized for bursty data and short packet transmissions, such as transmissions over short subframes. Such transmissions over short subframes may include e.g. voice calls, video streaming and web browsing transmissions. For example, in conventional Long Term Evolution (LTE) solutions, the length of the opportunity for DRX in voice data is more significant during the periods when the person receiving the call is speaking than during silent periods. Typically, a Voice over internet protocol (IP) (VoIP) packet inter-arrival time is 20 ms during speaking periods. During silent periods, the Silence Description (SID) packets used to generate comfort noise in real systems are assumed to be generated on 160 ms intervals.

Another limitation of conventional DRX solutions in LTE is the long wake-up latency when a UE is in idle mode. In LTE, the UE has to perform random access procedure and obtain a Radio Resource Control (RRC) connection again when a UE is woken up from idle mode by means of a paging procedure, which takes time.

SUMMARY

It is therefore an object to solve at least some of the above mentioned disadvantages and to improve the performance in a wireless communication network.

The above objectives are solved by the subject matter of the independent claims. Further advantageous implementation forms of the present embodiments can be found in the dependent claims.

According to a first aspect, the above mentioned objectives are achieved by a user equipment including a receiver configured to receive a downlink control signal (CTRLS) over a physical downlink control channel (PDCCH) from an access node. The user equipment also includes a processor, when the user equipment is in a Radio Resource Control (RRC) connected mode, configured to switch on the receiver at a time point ($t_{start\_symbol}$) when a symbol comprising the CTRLS starts in time domain and switch off the receiver at a time point ($t_{end\_symbol}$) when the symbol comprising the CTRLS ends in time domain.

A User Equipment, also known as a user device, a mobile station, wireless terminal and/or mobile terminal, is enabled to communicate wirelessly in a wireless communication network, sometimes also referred to as a cellular radio system. The communication may be made, e.g., between user equipments, between a user equipment and a wire connected telephone and/or between a user equipment and a server via a Radio Access Network (RAN) and possibly one or more core networks.

The proposed user equipment can be used to enhance the network performance by lowering delay in the network. Since the UE is kept in the RRC mode, the wake-up latency is greatly reduced, which is a major advantage for the overall performance of the wireless network.

For example, if the subframes used are short, e.g. in high-bandwidth ultra-dense network, it is beneficial to send data packets quickly by utilizing high bandwidth in order to then be able to maximize the sleep duration. Hence, use of shorter subframes makes it possible to adapt the discontinuous reception (DRX) mode for even shorter packet inter-arrival times. Ideally, an optimized DRX scheme could use the inter-arrival time of data packets of all kinds of traffic as an opportunity for DRX. This can be achieved by the proposed user equipment DRX mode.

It is foreseen that video streaming and web browsing will be the main type of data in future wireless networks deployed in dense urban centers. The proposed user equipment works according to a novel DRX mode that is optimized for bursty data, short packet transmission and ultra-dense networks. Thus, the proposed user equipment DRX mode is optimized for the expected main type of data usage in future wireless networks.

Thus, the proposed user equipment employs a novel DRX mode which is particularly useful in networks that use short subframes such as in future ultra-dense wireless networks. This novel DRX mode can be termed "sleep DRX" mode. The features of the sleep DRX mode include optimized power consumption for short subframes, mobility handling and short wake-up latencies. This novel sleep DRX mode solves the inefficiency problems the conventional DRX schemes will experience when using short subframes.

The proposed DRX mode can be understood as something in between the normal short/long DRX and the IDLE modes in a conventional LTE network. In particular, the proposed DRX mode is more energy efficient than the normal short/long DRX mode, and also has lower latencies than the IDLE mode.

The energy savings of the proposed sleep DRX mode can be explained by the fact that the UE does not need to keep on receiving data while decoding is performed. Thus, the sleep DRX mode has a DRX cycle with very short on-periods. In conventional DRX solutions for long term evolution (LTE), however, the user equipment (UE) must keep on receiving data while decoding is performed in order to understand to whom the data is intended, which is clearly inefficient.

Also, the short DRX latencies achieved with the proposed DRX mode follow from the fact that the UEs do not need to perform a random access procedure in order to obtain an RRC connection when they are woken up. Instead, an RRC connection is maintained with the UEs that are operating according to the proposed DRX mode.

The RRC states include an idle mode and a RRC connected mode. After the power is switched on for the UE, the UE stays in the idle mode until it transmits a request to establish an RRC connection. In idle mode, the RRC connection of the UE is closed on all layers of the access stratum. The RRC connected mode is entered when the RRC connection is established. The UE is then assigned a radio network temporary identity (RNTI) to be used as the UE identity on common transport channels.

The proposed user equipment thus provides for ultra-low power consumption, since the user equipment during the proposed sleep DRX mode only has to wake up for transmitting beacons and for monitoring the CTRLS of the control channel.

Also, short latency is achieved from the proposed sleep DRX mode to other operation modes, such as the normal DRX or non-DRX modes.

Further, mobility support by the network is provided, including user equipment tracking, since beacon transmissions are used. Thus, a solution is presented which consumes much less energy than conventional solutions for paging in idle mode.

In a first possible implementation form of a user equipment according to the first aspect, the CTRLS includes a wake-up signal (WUB), and the processor is further configured to judge if the WUB is for waking up the user equipment; and if yes, switch on the receiver at a time point twuB based on the WUB.

By usage of the WUB, the user equipment can by the network be set to wake up at a specific time point twuB, e.g. at the start of the next downlink control channel signal, as is described below. This also means that the user equipment can be allowed to sleep until this time point, which saves energy in the user equipment. By using an explicit user-specific WUB the receiver can be switched on according to the availability of data traffic for a specific user equipment. Thus, an optimization of the receiver sleeping cycles is possible. If no wake-up signal is sent for a specific user equipment, it can be immediately be allowed to go back to sleep again. In conventional DRX solutions for LTE, the UE must keep on receiving data while decoding is performed in order to understand to whom the data is intended, which is clearly inefficient.

In a second possible implementation form of a user equipment according to the first implementation form of the first aspect, the processor is further configured to switch on the receiver at the time point twuB based on the WUB according to a Discontinuous Reception (DRX) mode or according to a non-Discontinuous Reception (non-DRX) mode.

To wake up the UE according to a DRX mode according to this implementation form reduces the wake-up latency compared to the conventional LTE solution, in which the UE in idle mode needs to establish an RRC connection before it can implement a DRX mode. The features of the proposed sleep DRX mode include optimized power consumption for short subframes, mobility handling and short wake-up latencies.

In a third possible implementation form of a user equipment according to the second implementation form of the first aspect, the processor is preconfigured with information defining the discontinuous reception (DRX) mode and/or the non-discontinuous reception (non-DRX) mode.

To have the processor preconfigured with this information lowers the signaling needed for setting up the DRX mode and/or the non-DRX mode in the UE. It is here e.g. not necessary to include information for the DRX mode in the wake-up signal, which reduces the signaling.

In a fourth possible implementation form of a user equipment according to any one of the first to third implementation forms of the first aspect, the receiver is further configured to receive at least one more downlink control channel signal ($CTRLS_2$) from at least one more access node, wherein each access node is assigned with a physical downlink control channel (PDCCH), $PDCCH_2$ carrying a CTRLS, $CTRLS_2$ including a reference signal (RS), $RS_2$ and a WUB, $WUB_2$; and the processor is further configured to measure a signal to interference plus noise ($SINR_{RS}$) of the plurality of RS, $RS_2$ included in the plurality of CTRLS, $CTRLS_2$; and —select a $WUB_{sel}$ included in the CTRLS, $CTRLS_2$ having the best signal quality $SINR_{RS\_best}$ as the wake-up signal to be judged.

This implementation form reduces additional signaling and wake-ups from sleep in order to receive data, e.g. in ultra-dense network, since the UE here only monitors the "strongest" WUB, i.e. the WUB with best signal quality, and since the network could always direct data through the "closest" access nodes. Also, inter-cell interference coordination in the frequency domain can still be supported for the control channel. This implementation form also requires very little signaling.

When the UE monitors the CTRLS, $CTRLS_2$ from multiple access nodes, the effects of fading are mitigated since frequency diversity is provided.

Thus, an asynchronous sensing and selection of monitored CTRLS including wake-up search space is presented. Such an approach does not require dedicated signaling.

In a fifth possible implementation form of a user equipment according to any one of the first to fourth implementation forms of the first aspect, the receiver is further configured to receive at least one more downlink control channel signal from at least one more access node, wherein each access node is assigned with a PDCCH, $PDCCH_2$ carrying CTRLS, $CTRLS_2$ including a RS, $RS_2$ and a WUB, $WUB_2$; and the processor is further configured to measure a signal quality $SINR_{RS}$ of RS, $RS_2$ included in the plurality of CTRLS, $CTRLS_2$; and select a $WUB_{sel}$ included in a CTRLS, $CTRLS_2$ having a signal quality $SINR_{RS\_high}$ exceeding a predetermined signal quality $SINR_{RS\_pred}$ by a threshold $SINR_{thres}$ as the wake-up signal to be judged.

This implementation form reduces additional signaling and wake-ups from sleep in order to receive data, e.g. in ultra-dense network, since the UE here only monitors the "strongest" $WUB_{sel}$ in terms of signal-to-interference-plus-noise ratio (SINR), and the network could always direct data through the "closest" access nodes. Also, inter-cell interference coordination in the frequency domain can still be supported for the control channel. This implementation form also requires very little signaling.

When the UE monitors the CTRLS, $CTRLS_2$ from multiple access nodes, frequency diversity is provided, which reduces the effects of fading.

Thus, an asynchronous sensing and selection of monitored CTRLS including a wake-up search space is presented. Such an approach does not require dedicated signaling.

In a sixth possible implementation form of a user equipment according to the first aspect as such or to any one of the first to fifth implementation forms of the first aspect, the user equipment further includes a transmitter configured to transmit a beacon signal.

For the herein presented UEs and access nodes make it possible is to reduce, or eliminate, handovers and paging in ultra-dense networks, such as ultra-dense fifth generation (5G) networks. This is made possible by sending uplink beacon signals, which can be measured and tracked by the network. Hence, it can here be assumed that the network knows the best serving access nodes for UEs whenever the UEs are transmitting beacon signals with a beaconing periodicity being defined and/or known by the network.

According to a second aspect, the above mentioned objectives are achieved by an access node including a processor configured to generate a WUB, $WUB_2$ including at least one identifier indicating at least one user equipment for which it is intended, and a transmitter configured to transmit the WUB, $WUB_2$.

The proposed access node provides for ultra-low power consumption for user equipment, since a user equipment in the network during the proposed sleep DRX mode only has to wake up for transmitting beacons and for monitoring the CTRLS of the control channel e.g. for WUB, $WUB_2$.

In a first possible implementation form of an access node according to the second aspect, the processor is further configured to: receive a beacon signal; and —determine if the access node should transmit the WUB, $WUB_2$ based on the beacon signal and/or based on wake-up transmission information provided by a coordination entity node.

For the herein presented UEs and access nodes makes it possible is to reduce, or eliminate, handovers and paging in ultra-dense networks, such as ultra-dense 5G networks. This is made possible by sending uplink beacon signals, which can be tracked by the network. Hence, it can here be assumed that the network knows the best serving access nodes for UEs whenever the UEs are transmitting beacon signals with a beaconing periodicity being defined and/or known by the network. Since the wake-up signal is sent from the best serving access node(s), the necessary transmitted power can be kept low, which also makes spatial reuse of wake-up signals possible.

In a second possible implementation form of an access node according to the second aspect as such or to the first implementation form of the second aspect, the at least one identifier included in the WUB is a temporary identifier valid for a part of a network in which the at least one user equipment is located.

By allocating a temporary-identifier, its potential reuse in both time and space is made possible, which in turn allows the identifier space to be kept low.

In a second possible implementation form of an access node according to the second aspect as such or to any one of the first and second implementation forms of the second aspect, the WUB includes one information in the group of: information indicating a DRX mode according to which the at least one user equipment should switch on and off the receiver after the at least one user equipment has been woken up; and information indicating a non-DRX mode according to which the at least one user equipment should switch on the receiver after the at least one user equipment has been woken up.

To wake up the UE according to a DRX mode by usage of such wake-up signals results in optimized power consumption for the UE. It also reduces the latency compared to conventional LTE solutions for which the UE in idle mode needs to establish an RRC connection before it implements a DRX mode.

According to a third aspect, the above mentioned objectives are achieved by a method for a user equipment including: —receiving a downlink control signal (CTRLS) over a PDCCH from an access node; switching on a receiver in the user equipment at a point in time $t_{start\_symbol}$ when the user equipment is in a RRC connected mode and a symbol comprising the CTRLS starts in the time domain; and —switching off the receiver at a point in time $t_{end\_symbol}$ when the symbol comprising the CTRLS ends in the time domain.

The method for the UE can be used to enhance the network performance by lowering delay in the network. Since the UE is kept in the RRC mode, the wake-up latency is greatly reduced.

The RRC states include an idle mode and a RRC connected mode. After the power is switched on for the UE, the UE stays in the idle mode until it transmits a request to establish an RRC connection. In idle mode, the RRC connection of the UE is closed on all layers of the access stratum. The RRC connected mode is entered when the RRC connection is established. The UE is then assigned a radio network temporary identity (RNTI) to be used as the UE identity on common transport channels.

The proposed access node thus provides for ultra-low power consumption for the user equipment in the network, since the user equipment during the proposed sleep DRX mode only has to wake up for transmitting beacons and for monitoring the CTRLS of the control channel.

In a first possible implementation form of a method for a user equipment according to the third aspect, the method further comprises: judging if a WUB included in the CTRLS is for waking up the user equipment; and switching on the receiver at a point in time ($t_{WUB}$) based on the WUB.

In a second possible implementation form of a method for a user equipment according to the first implementation form of the third aspect, the method further comprises switching on the receiver at the twuB based on the WUB according to a DRX mode or according to a non-DRX mode.

In a third possible implementation form of a method for a user equipment according to the second implementation form of the third aspect, the processor is preconfigured with information defining the discontinuous reception (DRX) mode and/or the non-discontinuous reception (non-DRX) mode.

In a fourth possible implementation form of a method for a user equipment according to any one of the first to third implementation forms of the third aspect, the method further comprises: receiving at least one more $CTRLS_2$ from at least one more access node, wherein each access node is assigned with a PDCCH, $PDCCH_2$ carrying a CTRLS, $CTRLS_2$ including a RS, $RS_2$ and a WUB, $WUB_2$; measuring a signal quality $SINR_{RS}$ of the plurality of RS, $RS_2$ included in the plurality of CTRLS, $CTRLS_2$; and selecting a $WUB_{sel}$ included in the CTRLS, $CTRLS_2$ having the best signal quality $SINR_{RS\_best}$ as the wake-up signal to be judged.

In a fifth possible implementation form of a method for a user equipment according to any one of the first to fourth implementation forms of the third aspect, the method further comprises:—receiving at least one more downlink control channel signal from at least one more access node, wherein each access node is assigned with a PDCCH, $PDCCH_2$ carrying CTRLS, $CTRLS_2$ including a RS, $RS_2$ and a WUB, $WUB_2$; and measuring a signal quality $SINR_{RS}$ of RS, $RS_2$ included in the plurality of signals CTRLS, $CTRLS_2$; and selecting a $WUB_{sel}$ included in a CTRLS, $CTRLS_2$ having a signal quality $SINR_{RS\_high}$ exceeding a predetermined signal quality $SINR_{RS\_pred}$ by a threshold $SINR_{thres}$ as the wake-up signal to be judged.

In a sixth possible implementation form of a method for a user equipment according to the third aspect as such or to any one of the first to fifth implementation forms of the third aspect, user equipment transmits a beacon signal.

According to a fourth aspect, the above mentioned objectives are achieved by a method for an access node including: generating a WUB, $WUB_2$ including at least one identifier indicating at least one user equipment for which it is intended; transmitting the WUB, $WUB_2$.

The proposed access node provides for ultra-low power consumption for user equipment, since a user equipment in the network during the proposed sleep DRX mode only has to wake up for transmitting beacons and monitoring the CTRLS of the control channel e.g. for WUB, $WUB_2$.

In a first possible implementation form of a method for an access node according to the fourth aspect, the method further comprises: receiving a beacon signal; and —determining if the access node should transmit the WUB, $WUB_2$ based on the beacon signal and/or based on wake-up transmission information provided by a coordination entity node.

In a second possible implementation form of a method for an access node according to the fourth aspect as such or to the first possible implementation form of the fourth aspect, the at least one identifier included in the WUB is a temporary identifier valid for a part of a network in which the at least one user equipment is located.

In a third possible implementation form of a method for an access node according to the fourth aspect as such or to any one of the first and second implementation forms of the fourth aspect, the WUB includes one information in the group of: information indicating a DRX mode according to which the at least one user equipment should switch on and off the receiver after the at least one user equipment has been woken up; and information indicating a non-DRX mode according to which the at least one user equipment should switch on the receiver after the at least one user equipment has been woken up.

The advantages of the methods according to the third aspect or the fourth aspect, and their implementation forms, are the same as those for the corresponding user equipment and access node according to the first and second aspects, respectively.

The implementations described also relate to a computer program with a computer program code, which when runs by processor causes the processor to execute any described method. Further, the implementations described also relate to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the described aspects and implementation forms will be apparent from the following detailed description in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

An "or" in this description and the corresponding claims is to be understood as a mathematical OR which covers "and" and "or", and is not to be understand as an XOR (exclusive OR).

Also, the term "and/or" comprises any and all combinations of one or more of the associated listed items. In addition, the singular forms "a," "an" and "the" are to be interpreted as "at least one," thus also possibly comprising a plurality of entities of the same kind, unless expressly stated otherwise. It will be further understood that the terms "includes," "comprises," "including" and/or "comprising," specifies the presence of stated features, actions, integers, steps, operations, elements, and/or components, but do not preclude the presence or addition of one or more other features, actions, integers, steps, operations, elements, components, and/or groups thereof.

In this document, the expressions downlink (DL) is used for the transmission path from the access node to the user device. The expression uplink (UL) is used for the transmission path in the opposite direction, i.e., from the user device to the access node.

BRIEF DESCRIPTION OF THE DRAWINGS

Embodiments of the invention are described in more detail with reference to attached drawings illustrating examples of embodiments of the invention in which:

FIGS. 5a-b are a basic illustrations of a discontinuous reception concept.

FIGS. 6a-c are schematic illustrations of examples of information carried in a wake-up signal.

DETAILED DESCRIPTION OF ILLUSTRATIVE EMBODIMENTS

Figure 1:
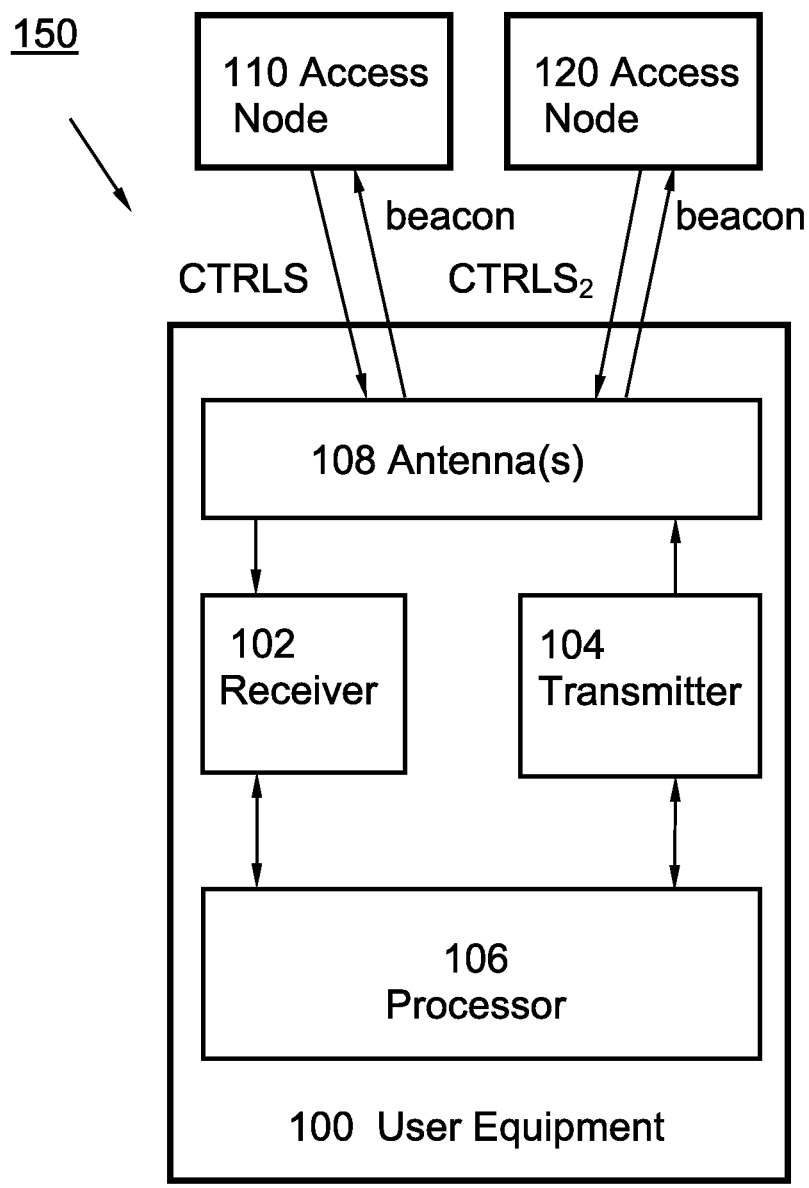
FIG. 1 is a block diagram illustrating a user equipment according to some embodiments.

The aspects described herein are defined as a user equipment, a method for a user equipment, an access node, and a method in an access node, which may be put into practice in the implementation forms/embodiments described below. These implementation forms may, however, be exemplified and realized in many different ways and are not to be considered as limited to the implementation forms set forth herein; rather, these implementation forms are provided so that this disclosure will be thorough and complete.

In wireless communication networks/systems, a user equipment is enabled to communicate wirelessly with other user equipments, with a wire connected telephone and/or with a server via a Radio Access Network (RAN) and possibly one or more core networks. The wireless communication may comprise various communication services such as voice, messaging, packet data, video, broadcast, etc.

As stated above, a user equipment may operate according to one of a number of different operation modes. One such operation mode is a discontinuous reception (DRX) mode. The DRX mode aims at saving energy in the user equipment (UE) by turning the receiver off during the instants of time where there is no data to be received. Hence, the design of the DRX mode depends on the type of transmitted data, and on the frame structure of the wireless network. The time periods when the UE should maintain its receiver switched-off in order to save battery may thus need to be altered, which leads to different modes of discontinuous reception being used for the UE.

In idle mode, a UE turns off its receiver provided it is not currently engaged in transmission. For services requiring different levels of connection, shorter or longer DRX periods may be needed for the connected mode. A non-DRX mode may also be implemented for services requiring continuous reception.

In conventional LTE technology solutions, a Physical Downlink Control Channel (PDCCH) and a Physical Downlink Shared Channel (PDSCH) are defined. The PDCCH carries Downlink Control Information (DCI). The PDSCH carries both user specific data and control signaling/messages to UEs. All UEs that expect any data, such as system information, random access response, paging, common control messaging, and/or user specific data or control messages, on the downlink has to monitor the DCI on the PDCCH first. The DCI informs the UEs about the downlink resource allocation.

A conventional DRX cycle comprises an "on-duration" period, during which the UE is awake and should monitor control signals CTRLS carried by the PDCCH, and an "opportunity for DRX" period, during which a UE can skip reception of downlink channels for battery saving purposes. However, during the "on-duration" period, the UE must in conventional solutions keep receiving samples from the data signal carried by the PDSCH if a downlink allocation is decoded from the control channel signal (CTRLS). This is due to the fact that the CTRLS is not yet decoded when the data signal is received, which means that the data signal must be stored at least until the control signal CTRLS has been decoded.

For example, a conventional DRX reception scheme may include an on-duration period having a length of 2 subframes in the time domain. The whole DRX cycle can then be 10 subframes long, without cycle start offset. In addition to that, the DRX scheme has timers for inactivity and retransmissions which can extend the active time beyond that of the on-duration period. Thus, the opportunity for DRX is then short, leading to a high energy consumption for the UEs.

According to conventional solutions, the network can help the UEs to save energy by estimating a suitable data burst inter-arrival time, and by assigning a DRX parameterization and allocations according to that DRX parameterization to the UEs. However, the conventional DRX schemes are rather inefficient from an energy consumption viewpoint, particularly for short subframes.

Also, future wireless networks are expected to use shorter subframes than today, since they aim at reaching below 1 ms for roundtrip latencies. The reason is mainly twofold. Firstly, short subframes are appropriate for bursty data such as data for video streaming and website browsing. Due to significantly faster radio interfaces for the future wireless networks, it will also be possible to sleep between packet arrivals without an increase of the experienced delay. Secondly, video streaming and website browsing are foreseen to be the main type of data in small cell environments. This is particularly true in future ultra-dense wireless networks.

It is therefore an object to improve the performance in a wireless communication network.

According to a first aspect, a user equipment 100 is presented. The user equipment 100 is schematically illustrated in FIG. 1, and includes a receiver 102 configured to receive a downlink control signal (CTRLS) over a PDCCH from an access node no.

The user device 100 also includes a processor 106 configured to, when the user equipment is in a Radio Resource Control (RRC) connected mode, switch on the receiver at a time point $t_{start\_symbol}$ when a symbol comprising the CTRLS starts in time domain. The processor 106 is further configured to switch off the receiver 102 at a time point $t_{end\_symbol}$ when the symbol comprising the downlink control channel signal (CTRLS) ends in time domain.

The user device further includes a transmitter 104 configured to transmit e.g. a beacon signal.

One or more antenna devices 108 can be included in the user device 100 and can be used for the reception and transmission of signals.

The wireless communication system 150 including the user equipment 10 and the access node 110 may at least partly be based on radio access technologies such as, e.g., $3^{rd}$ generation partnership project (3GPP) long term evolution (LTE), LTE-Advanced, Evolved Universal Terrestrial Radio Access Network (E-UTRAN), Universal Mobile Telecommunications System (UMTS), Global System for Mobile Communications (originally: Groupe Special Mobile) (GSM)/Enhanced Data rate for GSM Evolution (GSM/EDGE), Wideband Code Division Multiple Access (WCDMA), Time Division Multiple Access (TDMA) networks, Frequency Division Multiple Access (FDMA) networks, Orthogonal FDMA (OFDMA) networks, Single-Carrier FDMA (SC-FDMA) networks, Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 code division multiple access (CDMA) technologies, e.g., CDMA2000 1x RTT and High Rate Packet Data (HRPD), just to mention some few options.

Figure 2:
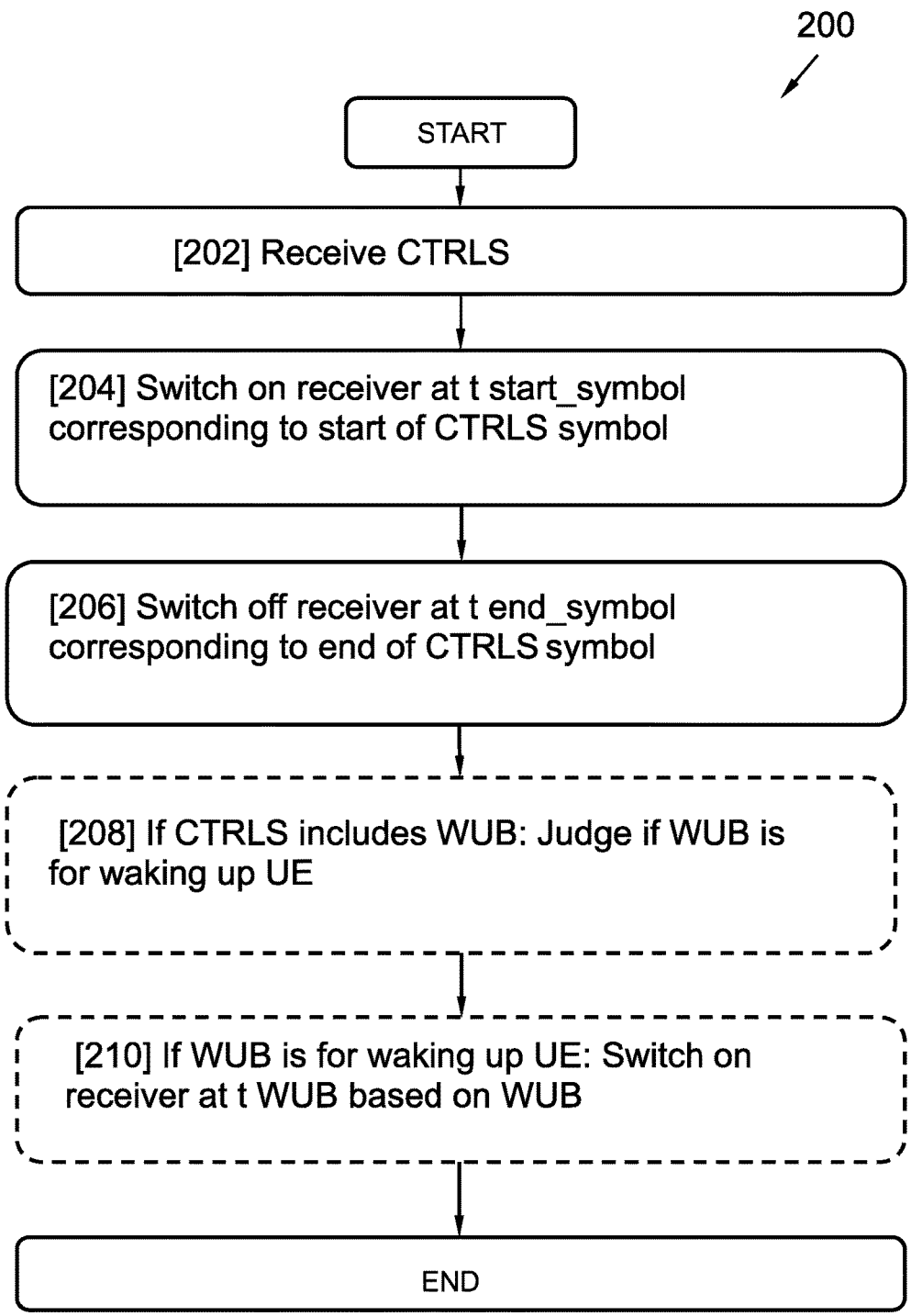
FIG. 2 is flow chart illustrating a method in a user equipment according to some embodiments.

FIG. 2 illustrates a flow chart diagram for method 200 for a user device 100 according to a third aspect.

In a first step 202 of the method for the user device 100, a CTRLS is received over a PDCCH from an access node 110.

In a second step 204 of the method, a receiver 102 in the user equipment 100 is switched on at a point in time $t_{start\_symbol}$ when the user equipment is in a RRC connected mode and a symbol comprising the CTRLS starts in the time domain.

In a third step 206 of the method, the receiver 102 is switched off at a point in time $t_{end\_symbol}$ when the symbol comprising the CTRLS ends in the time domain.

Figure 3:
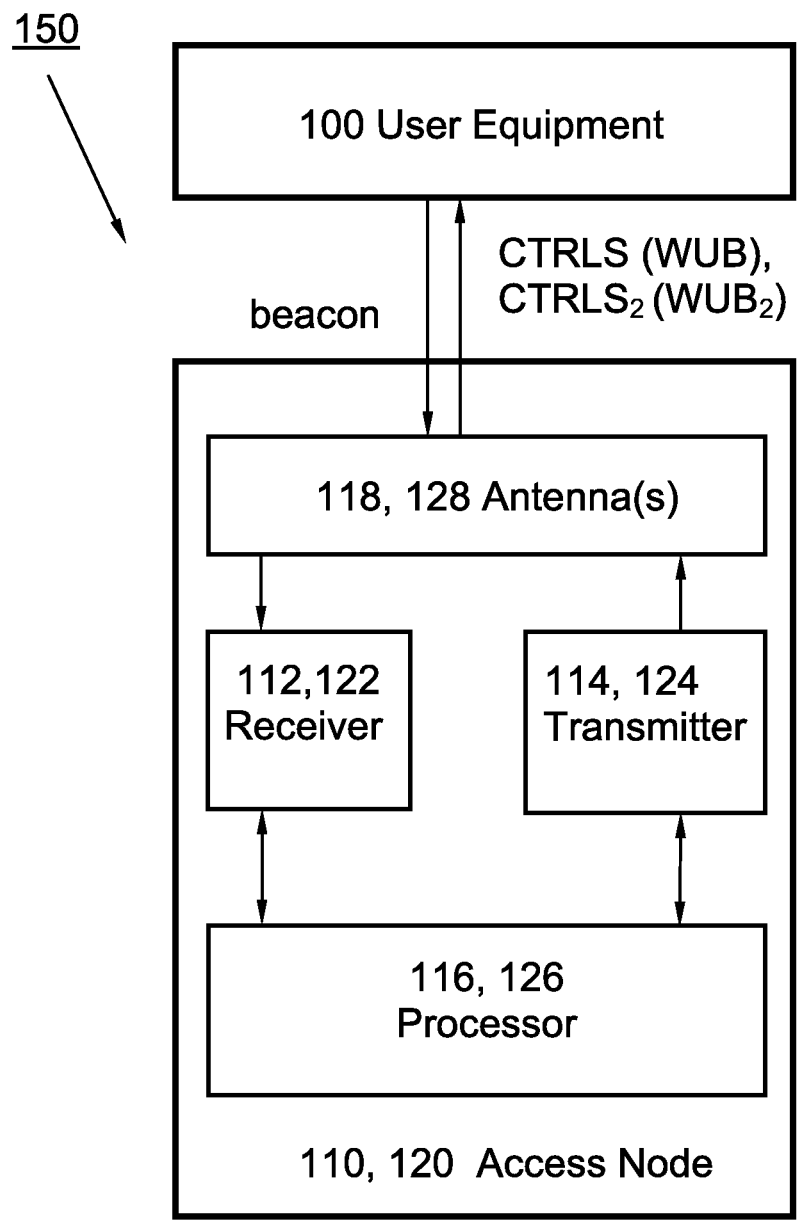
FIG. 3 is a block diagram illustrating an access node according to some embodiments.

An access node 110, 120 according to a second aspect is illustrated in FIG. 3. The access node 110, 120 includes a processor 116, 126 configured to generate a wake-up signal (WUB), $WUB_2$ including at least one identifier indicating at least one user equipment 100 for which it is intended. The access node 110, 120 further includes a transmitter 114, 124 configured to transmit the WUB, $WUB_2$.

The access node 110, 120 may further include a receiver 112, 122 configured to receive e.g. a beacon signal.

One or more antenna devices 118, 128 may be included in the access node and can be used for the reception and transmission of signals.

Figure 4:
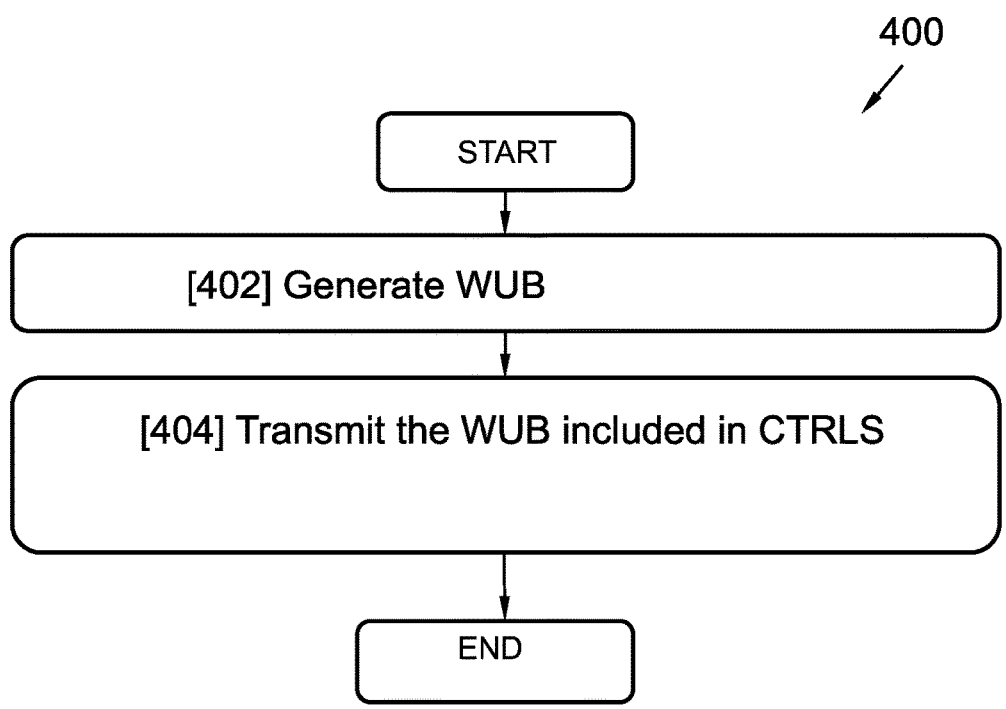
FIG. 4 is a flow chart illustrating a method in an access node according to an embodiment.

FIG. 4 illustrates a method 400 for an access node 110, 120 according to the fourth aspect.

In a first step 402 of the method, a wake-up signal (WUB), $WUB_2$ including at least one identifier indicating at least one user equipment 100 for which it is intended is generated.

In a second step of the method 404, the generated WUB, $WUB_2$ is transmitted.

In wireless networks, the network schedules UEs 100 to transmit and/or receive data to and/or from one or more access nodes 110, 120. UEs 100 that do not have scheduled data to transmit or receive may be set to function according to the herein proposed sleep DRX mode. The sleep DRX mode is an option that maximizes the energy saving of the UEs, while ensuring low-latency and mobility support in the eventuality that data transmission and/or reception is scheduled during this energy-saving sleep DRX mode.

In the sleep DRX mode, a UE 100 is in sleep mode except for monitoring the CTRLS included in one or more resource blocks of the control channel. A resource block may here be a subset of time-frequency allocations, time-code allocations, etc. Such a monitoring is used for synchronization purposes and for receiving a wake-up signal from the network, for example in case there is scheduled data to be received. The downlink (DL) control channel can be divided into resource blocks that are assigned to different access nodes of a same operator.

The control channel frequency domain division can be done either with fixed or dynamic allocations to mitigate inter access node control channel interference. Each access node is responsible for sending wake-up signals to the nearby UEs, e.g. when a transmission of data or control messages is needed for a UE.

The UE 100 may decide which resource block(s) of the control channel it should monitor for control channel signals CTRLS. This is not a mandatory feature, since the network could also make such an assignment to the UE. However, the former option is often preferable since it does not require signaling.

Typically, the UE 100 monitors the CTRLS in the resource blocks of the closest access nodes 110, 120. The distance between the UE 100 and the access nodes 110, 120, and consequently the assignment between the access nodes 110, 120 and the UEs 100, can be estimated by the network by usage of uplink beacons sent by the UEs 100.

It should be noted that the herein presented UEs and access nodes are particularly advantageous for ultra-dense networks, such as e.g. fifth generation (5G) ultra-dense networks, possibly having moving UEs. Thus, high mobility and efficient idle mode is supported, even though an inter-site distance might be short, e.g. less than 50 meters.

Additionally, it can be assumed that when only control channel signals CTRLS are sent to the UE 100, the transmission should be omni-directional to reach all UEs. Hence, the control channel could be divided in frequency between adjacent access nodes to avoid interfering with each other.

A method for inter-cell interference coordination using enhanced Physical Downlink Control Channel (ePDCCH) exists in LTE-Advanced (LTE-A). For LTE-A, ePDCCH control channel resources are embedded in the shared channel (PDSCH). The usage of ePDCCH was brought into LTE-A to create more control channel resources to support multiple component carriers and cross carrier scheduling. However, the usage of ePDCCH can be rather resource consuming, as is described below.

For the herein presented UEs 100 and access nodes 110, 120, the possibility that data channels are beamformed to target single UEs only can be exploited. Beamformed data channels can thus carry data and/or control information to targeted UEs only.

The herein presented UEs 100 and access nodes 110, 120 make it possible is to reduce, or eliminate, handovers and paging in ultra-dense networks, such as ultra-dense 5G networks. This is made possible by sending uplink beacon signals, which can be tracked by the network. Hence, it can here be assumed that the network knows the best serving access nodes for UEs whenever the UEs are transmitting beacon signals with a beaconing periodicity being defined and/or known by the network.

This reduces additional signaling and wake-ups from sleep in order to receive data, e.g. in ultra-dense network, since the UE here only monitors the "strongest" WUB, and since control channel elements and network could always direct data through the "closest" access node(s). Also, inter-cell interference coordination in the frequency domain can still be supported for the control channel.

It is assumed that short and long DRX can be configured to match predicted data packet inter-arrival times when a UE has an ongoing data transmission. However, in ultra-dense networks serving e.g. mobile users, it is beneficial to keep UEs connected during longer idle periods. Hereby, UEs can be woken up fast without searching UEs with paging and setting up connection again through random access procedure and RRC connection establishment. According to an implementation form, this fast reaction of the wake-up could be associated with network configured monitoring periodicity. Additionally, the UEs would not need to do power consuming cell measurements, cell search/PLMN search, cell selection/reselection etc. during idle mode. In ultra-dense networks, performing such operations would require quite frequent measurements from UEs during idle mode.

This is a great advantage for the proposed sleep DRX mode as compared to conventional solutions, e.g. for LTE-A, in which ePDCCH resources are configured to users via RRC signaling, which makes ePDCCH reconfiguration procedure quite resource consuming if e.g. motorway full of moving cars is covered with ultra-dense network.

If a user equipment decodes a wake-up signal/block and detects its own identifier, as is explained in detail below, the user equipment indicates a wake-up order for itself, and the user equipment shall thereafter start normal, long or short, DRX reception. The user equipment shall thus then after this also monitor the entire downlink control channel from the next on-duration timer start.

It is assumed that the network can select the serving access node for each user, and that the user equipment can select the monitored control channel search space without extra signaling e.g. in the ultra-dense hyper-cell environment.

Hereby, the user equipment power consumption could be minimized, without the risk of sacrificing wake-up latency, fast reachability and/or network performed user equipment position tracking.

The presented sleep DRX mode configuration signaling will comprise an indication that the sleep DRX mode is selected. This indicates that the UE will not have to decode more than the wake-up signal. The network can also signal to the user equipment the spectral resources used for a wake-up signal transmission in a geographical area. The signaling of the spectral resources may here include an indication of where in the frequency and time domain the UE can expect to find wake-up signals. This can e.g. be done by use of broadcasting signaling, or e.g. by use of user specific signaling. The geographical area in which a UE is located is known by the network due to transmission of uplink beacon transmissions.

The broadcast signaling may according to an implementation form further indicate the frequencies used for wake-up signals, while the wakeup time points twuB may be signaled using a user specific configuration of the DRX periods. In other implementation forms, the DRX configuration signaling may comprise both the DRX period and all frequency resources that are used for wake-up signals.

According to an implementation form, which is illustrated in FIG. 2, the CTRLS includes a WUB. The processor 106 is then further configured to judge 208 if the WUB is for waking up the user equipment loft The processor 106 can make this judgement based on the at least one identifier indicating at least one user equipment 100 for which it is intended, which is included in the WUB.

If the wake-up signal is intended for the UE 100, the processor is configured to switch on 210 the receiver at a time point twuB based on the WUB. Thus, the WUB indicates the time point twuB when the UE should be woken up.

The processor 106 can here be configured to switch on 210 the receiver 102 at the time point $t_{WUB}$ based on the WUB such that the UE after having been woken up operates according to a Discontinuous Reception (DRX) mode. The processor 106 can also be configured to switch on 210 the receiver 102 at the time point twuB such that the UE after having been woken up operates according to a non-DRX mode. The processor 106 can here be preconfigured with information defining the DRX mode and/or the non-discontinuous reception (non-DRX) mode.

FIGS. 5a and 5b schematically illustrate a DRX cycle comprising an "on-duration" period, during which the UE is awake and should monitor CTRLS carried by the PDCCH. The DRX cycle also comprise an "opportunity for DRX" period, during which a UE can skip reception of downlink channels for battery saving purposes.

For example, a proposed DRX reception scheme may include an on-duration period having a length of 1 subframe in the time domain. The whole DRX cycle can e.g. be lo subframes long. As stated above, the receiver is only on during the on-duration time, and is off for the remaining time of one cycle. The length of the cycle is typically configured according to the latency requirements of the applications on the user device and according to the resources available in the network. To achieve low energy consumption the cycles may typically be hundreds of milliseconds, corresponding to hundreds of frames, depending on the length of the frames.

According to the proposed user device, the on-duration period can be made very short, and may only include the symbol including the downlink control symbol CTRLS. This also means that the on-duration period in FIG. 5b starts with the time point $t_{start\_symbol}$ and ends with the time point $t_{end\_symbol}$. The proposed user device has thus a very short on-duration period including only the symbol carrying the downlink control signal CTRLS.

According to an implementation form, the receiver 102 is further configured to receive 202 at least one more downlink control channel signal (CTRLS$_2$) from at least one more access node 120. Each access node 110, 120 is here assigned with a PDCCH, PDCCH$_2$ carrying a CTRLS, CTRLS$_2$ including a reference signal (RS), RS$_2$ and a WUB, WUB$_2$.

The processor 106 is then further configured to measure a signal quality SINR$_{RS}$ of the plurality of RS, RS$_2$ included in the plurality of CTRLS, CTRLS$_2$. The processor 106 is also configured to select a wake WUB$_{sel}$ included in the CTRLS, CTRLS$_2$ having the best signal quality SINR$_{RS\_best}$ as the wake-up signal to be judged.

Thus, after having transmitted at least one beacon transmission, the UE shall measure which one of the CTRLS, CTRLS$_2$, each being associated with an access node and including a WUB, that has the highest signal quality. The likelihood that the symbol/resource block in which the WUB to a particular UE is being transmitted is in a deep fade, i.e. that the UE cannot receive its WUB, is low due to the strong line-of-sight component in ultra-dense networks. For example, the power ratio for a line-of-sight connection to that of the multipath components can be around 20 dB in urban micro-cell environments.

The RS, RS$_2$ are thus included in the downlink control signals CTRLS, CTRLS$_2$ together with the WUB, WUB$_2$. The reference signals and the wake-up signals are contiguous in the frequency domain. Each reference signal and its associated wake-up signal may be transmitted from a different access node. The user equipment measures a set of reference signals and determines, based on the quality of the measured reference signals, which associated wake-up signal it should decode. If the decoded wake-up signal carries the identifier of the user equipment, the user equipment follows the indications in the wake-up signal on whether to switch to a DRX mode or a non-DRX mode. Then, the selected wake-up signal is monitored until next beacon transmission occasion.

The plurality of access nodes transmitting the plurality of CTRLS, CTRLS$_2$ may here belong to the same operator. However, plurality of access nodes may also belong to different operators.

Since the downlink control channel signal transmissions from each access node may have relatively narrow bandwidth, they may be prone to variations due to fast fading. According to an implementation form, the quality measurements used may be defined as averages over multiple downlink control channel signal receptions. It is also possible that the quality measurements are defined based on trends of increasing or decreasing signal strength for different access node control channel signals between the measurement occasions. The measurements may here be defined in specifications, or may be defined by the implementation of the user equipment.

According to an implementation form, the receiver 102 is further configured to receive 202 at least one more CTRLS$_2$ from at least one more access node 120. Each access node 110, 120 is here assigned with a PDCCH, PDCCH$_2$ carrying a downlink control signal CTRLS, CTRLS$_2$ including a RS, RS$_2$ and a WUB, WUB$_2$.

The processor 106 is then further configured to measure a signal quality SINR$_{RS}$ of RS, RS$_2$ included in the plurality of CTRLS, CTRLS$_2$. The processor 106 is also configured to select a WUB$_{sel}$ included in a CTRLS, CTRLS$_2$ having a signal quality SINR$_{RS\_high}$ exceeding a predetermined signal quality SINR$_{RS\_pred}$ by a threshold SINR$_{thres}$ as the wake-up signal to be judged.

Thus, the UE may also monitor the CTRLS, CTRLS$_2$ from multiple access nodes in order to mitigate the effects of fading. Monitoring multiple control channel signals CTRLS, CTRLS$_2$ provides frequency diversity and robustness against fast fading.

A threshold value SINR$_{thres}$ can here be utilized when selecting the best access nodes. As an example, the above stated rule or some other equivalent method can be used once the quality for a number of CTRLS, CTRLS$_2$, i.e. for a number of reference signals, has been measured. The rule basically says that wake-up signals being included in CTRLS, CTRLS$_2$ having a high enough quality can be selected to be judged if the wake-up signals are for waking up the UE. The quality is here high enough SINR$_{RS\_high}$ if the measured quality SINR$_{RS}$ exceeds a predetermined signal quality SINR$_{RS\_pred}$ by a threshold SINR$_{thres}$. The predetermined signal quality SINR$_{RS\_pred}$ can here e.g. be a portion of the best reference signal quality SINR$_{RS\_best}$ in the set of CTRLS, CTRLS$_2$ from the multiple access nodes. Then, the selected wake-up signal is monitored until next beacon transmission occasion.

The plurality of access nodes transmitting the plurality of CTRLS, CTRLS$_2$ may here belong to the same operator. However, the plurality of access nodes may also belong to different operators.

Thus, the quality is measured on the reference signals. When the quality for different reference signals has been measured, the wake-up signals are decoded for those wake-up signals being associated with the reference signals having a quality SINR$_{RS\_high}$ exceeding the predetermined signal quality SINR$_{RS\_pred}$ by the threshold SINR$_{thres}$.

After decoding, the user device figures out if there is a wake-up indication for that particular user equipment, i.e. if there is an identifier for that user equipment in the wake-up signal. However, it is also possible that there are two or more different access nodes where each one of these access nodes transmit a wake-up signal to the same user equipment. In this case, the wake-up information from different access nodes should be the same. The user device may then have the same information twice. However, different wake-up information, e.g. including information regarding DRX mode or non-DRX mode, should not be sent from different access nodes. It can thus be assumed that there is some form of central coordination between access nodes present. Otherwise, the user equipment should only use the information from the wake-up signal associated to the highest measured reference signal quality.

According to an implementation form, the plurality of access nodes are synchronized, which e.g. means that the downlink control channel signals are sent from each one of the plurality of access nodes at essentially the same time.

As stated above, the downlink control channel signal transmissions from each access node may have a relatively narrow bandwidth, and may thus be prone to variations due to fast fading. According to an implementation form, the quality measurements used, such as e.g. the SINR$_{RS}$ value, may be defined as an average over multiple downlink control channel signal receptions, or may be defined based on trends indicating increasing or decreasing signal strength for different access node control channel signals between the measurement occasions.

It should be noted that the above described asynchronous downlink control channel signal sensing rule, using quality measurements of the reference signal, is not a mandatory feature of the proposed sleep DRX mode. It is only needed if the assignment of the downlink control channels monitored by the UEs is not done by the network. Such an option requires minimal signaling.

According to an implementation form, the processor 116, 126 in the access node 110, 120 is further configured to receive a beacon signal. The processor 116, 126 is also configured to determine if the access node 110, 120 should transmit the WUB, WUB$_2$ based on the beacon signal.

According to another implementation form of the access node, the processor is further configured to receive a beacon signal. The processor 116, 126 is also configured to perform measurements on the received beacon signal, and to transmit/provide information corresponding to the measurements to a coordinator entity node in the network. The coordinator entity node is then configured to interact with one or more access nodes and to receive such beacon signal measurement information from these one or more access nodes. The coordinator entity node can further be configured to decide/select which one or more access nodes that should transmit the WUB, WUB$_2$. The coordinator entity node can also be configured to inform the one or more selected access nodes that they should transmit the WUB, WUB$_2$ by transmission of wake-up transmission information. The access node and its processor 116, 126 can then further be configured to determine if the access node 110, 120 should transmit the WUB, WUB$_2$ based on the on wake-up transmission information provided by the coordination entity node.

The network/access node can configure the sleep DRX cycle and the narrowband beaconing resources/cycle. The user equipment can then send narrowband beacons according to the dedicated beaconing parameters obtained from the network/access node. The network and/or access nodes can then use the received beacons to determine which access node(s) that should transmit wake-up signals for a specific user equipment.

According to an implementation form, the at least one identifier included in the WUB is a temporary identifier valid for a part of a network in which the at least one user equipment is located, e.g. a radio network temporary identifier (RNTI). An RNTI may have a length of e.g. 16 bits.

FIGS. 6a-c schematically illustrate the contents of examples of WUB including identifiers indicating at least one UE.

The WUB may include information indicating a DRX mode according to which the at least one user equipment 100 should switch on and off the receiver 102 after the at least one user equipment 100 has been woken up. Thus, the DRX mode to be used by the UE may be configured based on the content of the WUB.

Correspondingly, the WUB may include information indicating a non-DRX mode according to which the at least one user equipment 100 should switch on the receiver 102 after the at least one user equipment 100 has been woken up. Thus, the non-DRX mode to be used by the UE may be configured based on the content of the WUB.

The WUB in FIG. 6a includes at least an identifier (ID) indicating at least one UE that need to wake up the receiver to receive data transmission. The WUB may also include information about the DRX mode or the non-DRX mode the user equipment shall enter upon waking up. Thus, the WUB may include information indicating use of DRX or non-DRX with a single bit. The WUB may also indicate information indicating use of non-DRX, or use of two or three different DRX modes, such as short DRX and long DRX, using more than one bit.

According to some implementation forms schematically illustrated in FIG. 6b, the WUB may comprise identifiers, such as e.g. RNTIs, indicating the identities of multiple user equipment that need to wake up. An RNTI may have a length of for example 16 bits. It is here necessary to limit the number of RNTIs so that the size of the WUB is not too big. The number of RNTIs is thus limited by the length of the RNTI, e.g. 16 bits results in $2^{16}$=65536 RNTIs.

FIG. 6c schematically illustrates that the CTRLS may include a RS according to an implementation form. This would allow a very short RS to be used, with possible extension of the length if there would not be any user that needs to wake up, i.e. if there is no need for including e.g. the RNTI in the CTRLS.

In this document, several time units are used, such as frame, subframe, slot (also referred to as time slot), and symbol (also referred to as physical symbol). A symbol is a certain time span of a physical signal that carries one spot in an I/Q constellation. The time span of each symbol differs depending on the radio access technology used.

Figure 7:
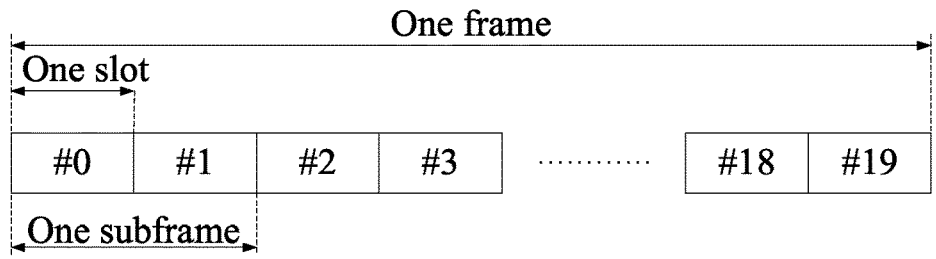
FIG. 7 is a schematic illustration of an example frame.

A certain number of symbols make up a time slot. A certain number of time slots make up one subframe. A certain number of subframes further make up one frame. In different radio access technologies these numbers differ. As schematically shown in FIG. 7, e.g. for LTE, one frame has lo subframes, and one subframes has two time slots, which adds up to 20 time slots for one frame.

A resource element is a two dimensional unit which is made up of one symbol in time domain and one sub carrier in frequency domain. A Control Channel Element (CCE) can e.g. for LTE include 36 consecutive resource elements. Another two dimensional unit is resource block (RB), which e.g. for LTE can include one slot in the time domain and 12 sub-carriers in the frequency domain.

Figure 8A:
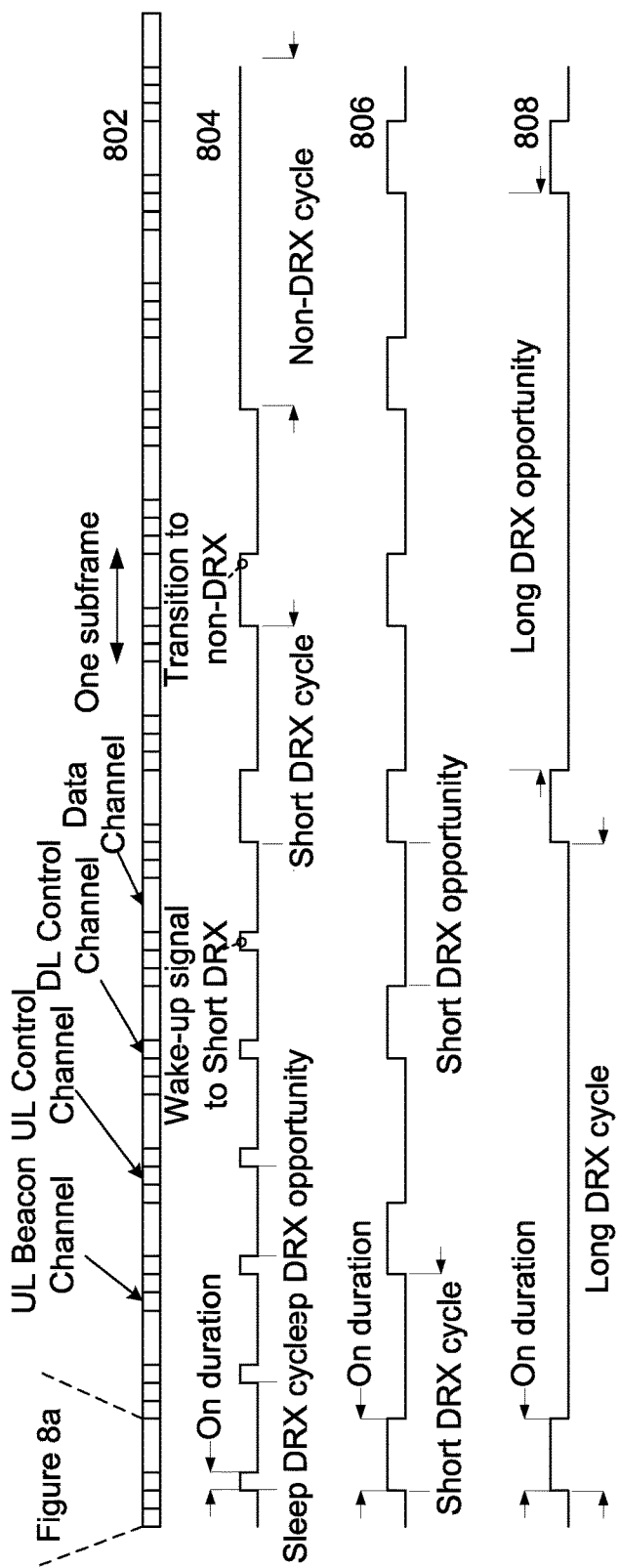
FIG. 8a-b are schematic illustrations of a signal space and implementation forms of the proposed sleep DRX mode concept.
Figure 8B:
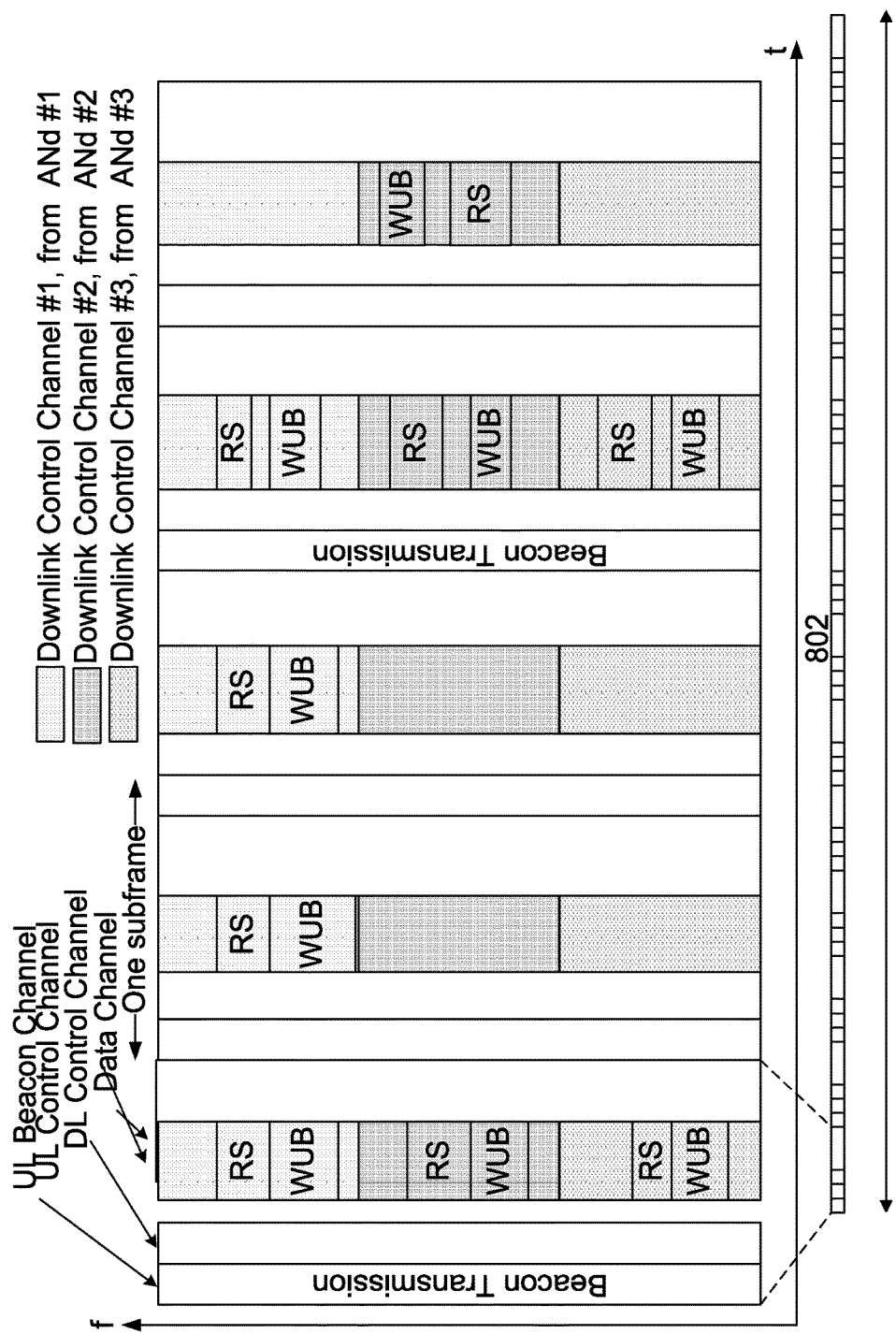

FIGS. 8a and 8b show schematic illustrations of the concept of the herein described sleep DRX mode using wake-up signals.

FIG. 8a illustrates the time-frequency domain for a signal space, wherein "t" indicates the time domain, e.g. having a unit of 1/10 ms. "f" indicates the frequency domain, wherein the unit e.g. can be a subcarrier.

As is described above, a UE transmits beacons signals in an uplink beacon channel. The UE also receives one or more downlink control channel signals from one or one more access nodes. In the example of FIG. 8a, three access nodes ANd#1, ANd#2, ANd#3 transmit such downlink control channel signals, each including a RS and a WUB. The RS are thus included in the CTRLS together with the WUB, and each RS and its associated wake-up signal may be transmitted from a different access node.

The UE then selects one $WUB_{sel}$, e.g. the wake-up signal being included in the downlink control channel signal having the best reference signal quality $SINR_{RS\_best}$ as the wake-up signal to be judged/decoded. In the example of FIG. 8a, the downlink control signal from the one access node ANd#1 initially has the best reference signal quality $SINR_{RS\_best}$ among the access nodes ANd#1, ANd#2, ANd#3 associated with the initially transmitted downlink control channels after the initial beacon transmission. The wake-up signal from access node ANd#1 is thus selected to be judged/decoded. Thus, after that only the wake-up signal from access node ANd#1 is decoded.

After the next beacon transmission, the wake-up signal from access node ANd#2 is instead selected to be judged/decoded. Thus, after that only the wake-up signal from access node ANd#2 is decoded.

The plurality of access nodes transmitting the plurality of downlink control channel signals may here belong to the same operator, or may also belong to different operators.

At the bottom of FIG. 8a, one subframe is reduced in size and is followed by a number or more subframes in the time domain. This row of subframes 802, each having the features of the subframe illustrated in FIG. 8a, is illustrated more in detail in FIG. 8b.

FIG. 8b thus illustrates a number of subframes 802 lined up after each other in the time domain. Below this row of subframes 802, and referring to these subframes 802, a first 804, a second 806, and a third 808 DRX indication examples are illustrated. The DRX indication examples 804, 806, 808 illustrates when the receiver in the UE has its on-duration periods (high value), sleep DRX periods (low value) and sleep DRX opportunities (low value) etc.

As is illustrated by the first DRX indication example 804, the UE is in a sleep DRX mode with short on-durations during six (6) consecutive subframes, during which the UE receives downlink control channel signals and judges if there is a wake-up signal intended for this user equipment. Before the point in time indicated by "Wake-up signal to Short DRX" in FIG. 8a, no wake-up signal has been identified as intended for the UE. At the point in time indicated by "Wake-up signal to Short DRX", the user equipment indicated in the wake-up signal switches into a short-DRX cycle mode at the start of the next downlink control channel signal. Thus, the start of the next downlink control channel signal here corresponds to the time point $t_{WUB}$. After two (2) subframes, the user equipment further receives an indication over the downlink control channel to switch to a non-DRX cycle mode.

As is illustrated by the second DRX indication example 806, the UE is configured for a short DRX mode where the on-duration now spans over both the downlink control channel part and the data part as in conventional LTE systems.

As is illustrated by the third DRX indication example 808, the UE is configured for a long DRX mode where the on-duration also spans over both the downlink control channel part and the data part as in conventional LTE systems. The DRX cycle is here longer than the short DRX cycle in the second DRX indication example 806.

Figure 9:
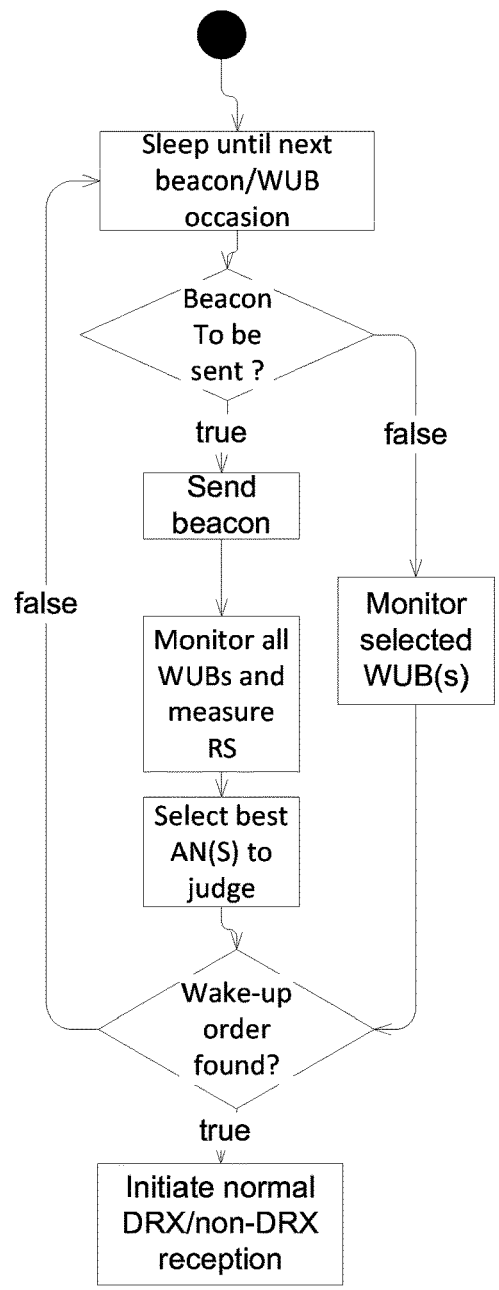
FIG. 9 is a flow chart illustrating an implementation form of the proposed sleep DRX mode.

FIG. 9 is a flow chart diagram for an implementation form of a method for a UE according to the third aspect. The UE first sleeps until there is an occasion to send an UL beacon transmission and/or receive a WUB. If there is a beacon to be sent, the UE and its transmitter transmit the beacon. The UE then monitors a plurality of WUBs and measures a plurality of corresponding reference signals. One or more WUBs are selected for judging if they are intended for the UE. The selected WUBs are decoded and it is judged if any of these are for the UE, i.e. by checking if there is an identifier indicating the UE. If it is judged that a WUB is for the UE, a normal DRX or non-DRX operation is initiated. If it is judged that the WUBs are not for the UE, the UE goes back to sleep until the next beacon and/or WUB occasion.

If there is no beacon to be sent, the UE instead continues to monitor the previously selected WUBs. And one or more WUBs are selected for judging if they are intended for the UE as described above.

Furthermore, the methods described above and in the claims may be implemented in a computer program with a computer program code, which when runs by processor causes the processor to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that the user equipment 100 and the access node 110, 120 comprise the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, digital signal processors (DSPs), mass storage devices (MSDs), time compression multiplexing (TCM) encoder, TCM decoder, power supply units, power feeders, communication interfaces, communication protocols, etc. which are suitably arranged together for performing the presented aspects and implementation forms.

Especially, the processors of the present devices may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

What is claimed is:

1. A user equipment comprising:
a transmitter configured to transmit a beacon signal;
a receiver configured to receive a downlink control signal over a physical downlink control channel (PDCCH), from an access node;
a processor; and
a non-transitory computer readable storage medium storing a program for execution by the processor, the program including instructions to:
switch on the receiver at a first time point, in response to a symbol comprising the downlink control signal starting in time domain, while the user equipment is in a radio resource control (RRC) connected mode; and
switch off the receiver at a second time point, in response to the symbol comprising the downlink control channel signal ending in time domain, while the user equipment is in the RRC connected mode;
wherein the downlink control signal comprises a wake-up signal (WUB), wherein the instructions further comprise instructions to:
determine whether the WUB instructs the user equipment to wake up; and
switch on the receiver at a third time point, in response to determining that the WUB instructs the user equipment to wake up.

2. The user equipment of claim 1, wherein the instructions to switch on the receiver at the third time point further comprise instructions to:
switch on the receiver at the third time point according to a Discontinuous Reception (DRX) mode or according to a non-Discontinuous Reception (non-DRX) mode.

3. The user equipment of claim 2, wherein the processor is preconfigured with information defining the DRX mode or information defining the non-DRX mode.

4. The user equipment of claim 1:
wherein the receiver is further configured to receive a plurality of downlink control channel signals from a plurality of access nodes, wherein access nodes of the plurality of access nodes are assigned PDCCHs carrying the downlink control channel signals, wherein the plurality of downlink control channel signals comprise a plurality of RSs and a plurality of WUBs; and
wherein the instructions further comprise instructions to:
measure signal to interference plus noise rations (SINRs) of the RSs; and
select a selected WUB of the plurality of WUBs on the downlink control channel of the plurality of downlink control channels having a RS having a best SINR to be WUB to be determined.

5. The user equipment of claim 1:
wherein the receiver is further configured to receive a plurality of downlink control channel signals from a plurality of access nodes, wherein assess nodes of the plurality of access nodes are assigned PDCCHs carrying downlink control signals, wherein the plurality of downlink control signals comprise a plurality of RSs and a plurality of WUBs; and
wherein the instructions further comprise instructions to:
measure a plurality of SINRs of the plurality of RSs; and
select a selected WUB of the plurality of WUBS on a downlink control channel signal of the plurality of having a SINR exceeding a predetermined SINR by a SINR threshold as the wake-up signal to be determined.

6. An access node comprising:
a receiver configured to receive a beacon signal;
a processor;
a non-transitory computer readable storage medium storing a program for execution by the processor, the program including instructions to:
based on the received beacon signal, determine whether to transmit a wake-up signal (WUB);
generate the WUB comprising an identifier indicating a user equipment for which the WUB is destined in response to determining that the WUB is to be transmitted based on the received beacon signal; and
a transmitter configured to transmit the WUB.

7. The access node of claim 6, wherein the instructions further comprise instructions to:
determine whether to transmit the WUB based on wake-up transmission information provided by a coordination entity node.

8. The access node of claim 6, wherein the identifier is a temporary identifier valid for a part of a network in which the user equipment is located.

9. The access node of claim 6, wherein the WUB comprises:
information indicating a discontinuous reception (DRX) mode according to which the user equipment is instructed to switch the receiver on and according to which the user equipment is instructed to switch the receiver off, after the one user equipment has been woken up.

10. The access node of claim 6, wherein the WUB comprises:
information indicating a non-discontinuous reception (non-DRX) mode according to which the user equipment is instructed to switch the receiver on, after the user equipment has been woken up.

11. A method comprising:
transmitting, by a user equipment, a beacon signal;
receiving, by the user equipment from an access node, a downlink control signal over a physical downlink control channel (PDCCH);
switching on a receiver in the user equipment at a first time point, while the user equipment is in a radio resource control (RRC) connected mode, in response to a symbol comprising the downlink control signal starting in time domain; and switching off the receiver at a second time point, while the user equipment is in the RRC connected mode, in response to a symbol comprising the downlink control channel signal ending in time domain;

determining whether a wake-up signal (WUB) included in the downlink control channel signal instructs the user equipment to wake up; and switching on the receiver at a third time point, in response to determining that the WUB instructs the user equipment to wake up.

12. A method comprising:

receiving, by an access node from a user equipment, a beacon signal;

determining, by the access node, whether to transmit a wake-up signal (WUB) based on the received beacon signal;

generating, by the access node, the WUB comprising an identifier indicating a user equipment for which the WUB is destined in response to determining that the WUB is to be transmitted based on the received beacon signal; and transmitting, by the access node, the WUB.

* * * * *